United States Patent [19]

Hirota et al.

[11] Patent Number: 5,063,097

[45] Date of Patent: Nov. 5, 1991

[54] OPTICAL RECORDING MEDIUM

[75] Inventors: Kusato Hirota, Otsu; Gentaro Ohbayashi, Kusatsu; Toshiharu Nakanishi, Otsu, all of Japan

[73] Assignee: Toray Industries, Inc., Tokyo, Japan

[21] Appl. No.: 450,782

[22] Filed: Dec. 14, 1989

[51] Int. Cl.$^5$ ............................................. B32B 3/02
[52] U.S. Cl. ...................................... 428/65; 428/64; 428/913; 369/283; 369/288; 346/76 L; 346/135.1
[58] Field of Search .......................... 428/64, 65, 913; 369/283, 288; 346/76 L, 135.1

[56] References Cited

U.S. PATENT DOCUMENTS

| | | |
|---|---|---|
| 3,530,441 | 9/1970 | Ovshinsky. |
| 4,509,161 | 4/1985 | Van de leest et al. ............... 430/321 |
| 4,709,363 | 11/1987 | Dirks et al. ............................ 428/65 |
| 4,954,379 | 9/1990 | Nishida et al. ....................... 428/64 |

FOREIGN PATENT DOCUMENTS

| | | |
|---|---|---|
| 0121426 | 10/1984 | European Pat. Off. . |
| 0153807 | 9/1985 | European Pat. Off. . |
| 0186227 | 7/1986 | European Pat. Off. . |
| 0195532 | 9/1986 | European Pat. Off. . |
| 0217293 | 4/1987 | European Pat. Off. . |
| 62-196181 | 8/1987 | Japan ..................................... 428/64 |
| 10438 | 1/1989 | Japan . |
| 1211249 | 8/1989 | Japan . |

OTHER PUBLICATIONS

Yamada et al., "High Speed Overwritable Phase Change Optical Disk Material", 1987, pp. 61–66.
K. Watanabe et al., J. Appl. Phys., 54 (3), Mar. 1983, pp. 1256–1260.
Derwent Abstract (J6 3225-934-A).
N. Yamada et al., Jap. J. of Appl. Phys., 26 (1987), Supp. 26-4, pp. 61–66.
Patent Abstracts of Japan, Kokai No. 1-211249, Nov. 21, 1989.
Patent Abstracts of Japan, Kokai No. 1-10438, Apr. 27, 1989.

Primary Examiner—Patrick J. Ryan
Assistant Examiner—Elizabeth Evans
Attorney, Agent, or Firm—Armstrong, Nikaido, Marmelstein, Kubovcik & Murray

[57] ABSTRACT

In an optical recording medium of the type on which information can be written, erased, and read by irradiating light to a recording layer formed on a substrate and in which writing and erasing of the information are effected by phase transition between an amorphous phase and a crystalline phase, this invention relates to an optical recording medium which includes at least a recording layer and protective layers and the composition of the recording layer comprises at least one kind of metals selected from the group consisting of palladium (Pd), nickel (Ni), silver (Ag), and gold (Au); antimony (Sb); germanium (Ge); and tellurium (Te), and is expressed by the formula given below. The present invention provides an optical recording medium which has a high erasing speed, is excellent in recording characteristics such as a carrier-to-noise ratio, an erase ratio, recording sensitivity, etc., is capable of a large number of writing and erasing cycles, is excellent in thermal stability, oxidation resistance and moisture-and-heat resistance, and has a long service life.

$(M_x Sb_y Te_{1-x-y})_{1-z}(Te_{0.5}Ge_{0.5})_z$ $0.01 \leq x \leq 0.1$ $0.35 \leq y \leq 0.65$ $0.1 \leq z \leq 0.2$ where each of x, y, z and 0.5 represents the atomic fraction of each element and M represents at least one kind of metals selected from the group consisting of Pd, Ni, Ag and Au.

10 Claims, 1 Drawing Sheet

OPTICAL RECORDING MEDIUM

BACKGROUND OF THE INVENTION

1. Field of the Invention

This invention relates to optical recording media capable of writing and reading information by irradiation of a light beam. More particularly, the invention relates to rewritable phase change optical recording media having functions of erasing and rewriting recorded information and capable of writing information at a high speed and with a high recording density, such as optical disks, optical cards, optical tapes and so forth.

2. Description of the Prior Art

Technique of conventional rewritable optical recording media by utilizing phase change of recording layer is as follows.

Optical recording media have a recording layer consisting of tellurium as its principal component. A focused laser beam pulse is irradiated for a short period of time to a crystalline recording layer at the time of writing to melt at the spot of the recording layer. The fused recording layer is quenched by thermal diffusion and is solidified, thereby providing recording marks in amorphous state.

Reflectance of the recording marks is lower than that in the crystalline state and the recording marks can be read optically as recording signals.

A laser beam is irradiated to the recording mark portions at the time of erasing to heat the recording layer to a temperature below its melting point but above its crystallization temperature so that the recording marks in the amorphous state can be crystallized and returned to the original non-recorded state.

Definite examples of such rewritable phase change optical recording media, there are, as recording layers, recording materials whose thermal stability is improved by adding small amounts of cross linking elements such as Ge and Sb to tellurium or Te-Se alloy, such as $Te_{81}Ge_{15}Sb_2S_2$ (Japanese patent application publication No. 47-26897) and $Te_{80}Sb_{10}Se_{10}$ (Japanese patent application Kokai publication No. 61-145738).

However, the recording layers involve a drawback that since they cause phase separation into tellurium in the crystalline state and tellurium compounds at the time of switching from the amorphous state to the crystalline state, the crystallization speed and the speed of the erasing process or of the writing process of the recording information are low.

To compensate for the erasing speed of the recording layer having such a low crystallization speed, there has been proposed a technique which makes the erasing process by use of an exclusive optical head for the erasing process with a light beam elongated in a travelling direction of the medium.

In accordance with such a technique, however, the optical head is complicated in structure and its mass-production is difficult. Even when the erasing light beam is elongated in cross section in order to improve the erasing speed, the technical upper limit of the elongation is up to about 10 μm and in order to accomplish higher speed writing and erasing processes, a high crystallization speed must be attained.

Known recording layers having a high crystallization speed use Sb-Se alloy (Japanese patent application Kokai publication No 60-155495), $Sb_2Te_3$ alloy [K. Watanabe et al, J. Appl. Phys. 54, 1256–1260 (1983)] and $TeO_x$:Sn (Japanese patent application Kokai publication No. 59-185048), and Te-Ge-Sb alloy [Japanese patent application Kokai publications No. 62-209742 and No. 63-225934; N. Yamada et al, Jpn. J. Appl. Phys., 26, Suppl. 26-4, 61–66(1987)], and the like The optical recording media using Sb-Se alloy as the recording layer involve a problem that noise in the read signals increases with the writing and erasing cycles. The optical recording media using $Sb_2T_3$ alloy as the recording layer is not free from the problem of thermal instability of the recording marks because the crystallization temperature from the amorphous state is as low as below 100° C. Recording media utilizing $TeO_x$:Sn for the recording layer have shown a fair degree of improvement in or relating to the erasing speed, but the improvement is still not sufficient to overcome all of the problems in the prior art. Furthermore, the optical recording media using the Te-Ge-Sb alloy have drawbacks that when the composition is a high speed erasable composition, deformation is liable to occur and openings are produced in the recording layer at the time of writing and its reliability is low, though it has reversibility of writing and erasing. In the high speed erasable composition, the crystallization temperature in the amorphous state is somewhat low, from 123° to 142° C., so that the thermal stability is low and the erasability is not sufficient. Accordingly, it has not been possible to satisfy simultaneously high speed erasability and thermal stability.

SUMMARY OF THE INVENTION

It is therefore an object of the present invention to provide rewritable optical recording media whose erasing speed is improved by increasing the crystallization speed.

It is another object of the present invention to provide optical recording media which are excellent in recording characteristics such as a carrier-to-noise ratio, erasability, and the like.

It is still another object of the present invention to provide optical recording media with small deteriorations of write, read and erasing characteristics even when the writing, erasing and rewriting processes are repeated.

It is still another object of the present invention to provide optical recording media which have a high crystallization temperature and are excellent in thermal stability.

It is a further object of the present invention to provide optical recording media which are excellent in oxidation resistance and moisture and heat resistance and have a long service life.

In other words, the present invention relates to optical recording media capable of writing, erasing and reading information by irradiation of light onto a recording layer formed on a substrate, wherein writing and erasing of the information are effected by the phase transition between the amorphous phase and the crystalline phase, wherein at least the recording layer and a protective layer for preventing deformation or abrasion (protective layer) are provided, wherein the recording layer comprises at least one metal selected from the group consisting of palladium (Pd), nickel (Ni), silver (Ag), and gold (Au); antimony; germanium; and tellurium, and wherein the composition is expressed by the following formula:

$$(M_xSb_yTe_{1-x-y})_{1-z}(Ge_{0.5}Te_{0.5})_z$$

$0.01 \leq x \leq 0.1$ $0.35 \leq y \leq 0.65$ $0.2 \leq z \leq 0.4$ where each of x, y, z and 0.5 represents the atomic fraction of each element, and M is at least one metal selected from Pd, Ni, Ag and Au.

DESCRIPTION OF THE PREFERRED EMBODIMENTS

Figure 1:
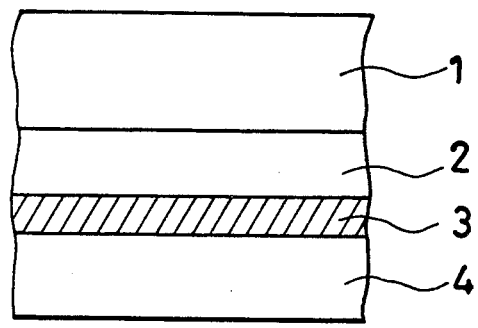
FIG. 1 is a schematic sectional view of an optical recording medium in accordance with the present invention.

The present invention relates to optical recording media capable of writing, erasing and reading information by the irradiation of light onto a recording layer formed on a substrate, wherein writing and erasing of the information are effected by phase transition between the amorphous phase and the crystalline phase, wherein the optical recording medium includes at least the recording layer and a protective layer for preventing deformation or abrasion (protective layer), wherein the composition of the recording layer comprises antimony, germanium and tellurium and at least one metal selected from the group consisting of palladium (Pd), nickel (Ni), silver (Ag), and gold (Au); and wherein the composition is expressed by the following formula:

$(M_xSb_yTe_{1-x-y})_{1-z}(Ge_{0.5}Te_{0.5})_z$ $0.01 \leq x \leq 0.1$ $0.35 \leq y \leq 0.65$ $0.2 \leq z \leq 0.4$ where each of x, y, z and 0.5 represents the atomic fraction of each element, and M is at least one metal selected from Pd, Ni, Ag and Au.

The M-Sb-Te alloy (where M is at least one member selected from the group consisting of Pd, Ni, Ag and Au) that constitutes the principal component of the recording film is liable to become the amorphous state, has a low melting point and can be easily molten by heating by the irradiation of light. Therefore, amorphous recording marks can be formed easily.

This alloy has a higher crystallization speed than a binary alloy of Sb-Te and can be erased by the irradiation of a laser beam of about 500 to about 150 nsec. Unlike the Sb-Se alloy systems, the recording film consisting of this alloy as the main ingredient is free from irreversible phase separation caused by the writing and erasing cycles and from formation of coarse crystals, and can reduce degradation of the recording characteristics typified by fluctuation of the recording sensitivity and by drop of the carrier-to-noise ratio. Furthermore, this alloy has high oxidation resistance and high moisture and heat resistance. Since the recorded information is not lost by corrosion or the like in the course of use for a long period, the media life can be extended.

In order to further improve thermal stability of this alloy in the amorphous state, the recording layer of the present invention additionally includes stoichiometric compound GeTe to form mixed crystal. The typical crystal state of the M-Sb-Te alloy described above is a non-stoichiometric solid solution phase having a single crystal structure of a rhombhedral or face-centered cubic and since its crystal structure and lattice constant are analogous to those of GeTe, solid solution can be formed easily in the recording layer of the present invention. The typical crystal state of this solid solution comprising the recording layer of the present invention is a novel non-stoichiometric compound regarded as a single phase from the result of X-ray diffraction analysis. Since the crystal state is substantially the single phase, phase separation and segregation of the composition are difficult to occur with the writing and erasing cycles and fluctuation of the recording characteristics can be reduced. The crystal state of the recording layer of the optical recording media in accordance with the present invention is the solid solution phase which can be regarded substantially as the single phase and the phase separation hardly occurs at the time of change from the amorphous state to the crystal state. Accordingly, the crystallization speed is high and the writing, erasing and rewriting processes can be made at a high speed and thermal stability is high, as well.

If the atomic fraction x of the metal expressed by M in the composition of the recording layer described above such as Pd is greater than 0.1, drop of erasability and increase in the noise level in the read-out signals occur and it becomes more difficult to change the crystal into amorphous. If it is less than 0.01, significant effects such as improvement of the effects of the thermal stability in the amorphous state and of the erasability and the carrier-to-noise ratio cannot be obtained.

If the atomic fraction y of Sb is greater than 0.65, the writing and erasing cyclability gets deteriorated. If it is less than 0.35, the writing and erasing cyclability gets likewise deteriorated and the erasing speed becomes lower.

If the atomic fraction z of the $Ge_{0.5}Te_{0.5}$ compound is greater than 0.4, the crystallization speed becomes low and so the high speed erasing process becomes difficult. If it is smaller than 0.2, the thermal stability of recording marks drops because the crystallization temperature is low.

Particularly preferred is the recording film having the composition of the formula (1) containing Pd and/or Ni because degradation of the recording characteristics due to the repetitive writing, erasing or rewriting cycles is extremely low, the erasing speed and thermal stability are high.

Formula (1)

$(M_xSb_yTe_{1-x-y})_{1-z}(Ge_{0.5}Te_{0.5})_z$ $0.01 \leq x \leq 0.1$ $0.35 \leq y \leq 0.65$ $0.2 \leq z \leq 0.4$ where each of x, y, z and 0.5 represents the atomic fraction of each element and M represents the element of Pd and, or Ni.

The thickness of the recording layer in the present invention is preferably from 10 to 150 nm to keep the better writing sensitivity. To obtain a higher carrier-to-noise ratio of the read-out signals, the thickness is preferably from 40 to 150 nm.

Layers for preventing deformation or abrasion are disposed on at least one surface preferably both surfaces of the recording layer of the present invention. The optical recording medium has a structure comprising:
substrate/first protective layer/
recording layer/second protective layer
as shown in FIG. 1, for example.

In the drawing, reference numerals represent the following members:
1: substrate
2: first protective layer
3: recording layer
4: second protective layer However, the structure is not particularly limited to this. Therefore, other layers such as a resin protective layer of a UV curing resin or the like and an adhesive layer for lamination with another substrate may be disposed on the second protective layer within the scope where the effect of the present invention is not deteriorated.

The protective layer is disposed in order to prevent deformation of the substrate and the recording layer due to heat given at the time of writing and to prevent degradation of the write characteristics. For the protective layer, inorganic materials such as ZnS, SiO$_2$, and the like are used. Particularly preferred are a thin film of ZnS, oxides of a metal such as Si, Ge, Ti, Zr and Te, or their mixtures because of its high heat resistance. The ZnS film is preferred particularly because degradation of the writing sensitivity and the carrier-to-noise ratio is difficult to occur with repetition of writing and erasing. The thickness of the protective layer is generally from 10 to 500 nm, and is preferably from 10 to 300 nm because the protective layer does not peel easily and defects such as cracks do not occur easily.

Figure 2:
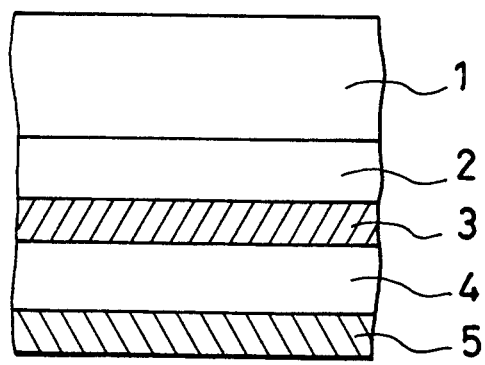
FIG. 2 is a schematic sectional view showing another structure of the optical recording medium of the present invention.
Figure 3:
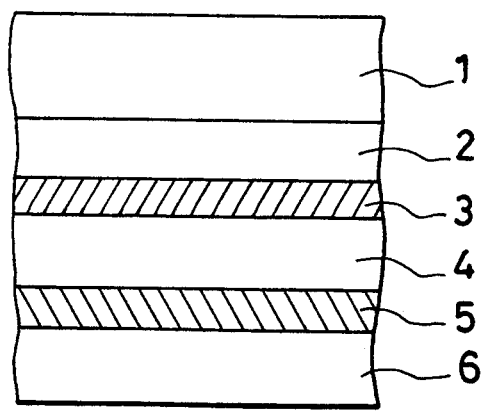
FIG. 3 is a schematic sectional view showing still another structure of the optical recording medium of the present invention.

In the present invention, a reflective layer such as a thin metal film can be deposited on the protective layer. In this case, if the optical recording medium is of the type where the rays of light are irradiated from the back of the substrate, the structure consists of
substrate/first protective layer/
recording layer/second protective layer/
reflective layer
as shown in FIG. 2.

In the drawing, reference numerals represent the following members:
1: substrate
2: first protective layer
3: recording layer
4: second protective layer
5: reflective layer However, the structure is not limited to this. Accordingly, other layers such as a resin protective layer of a UV curing resin and an adhesive layer for lamination with another substrate may be formed on the reflective layer within the scope where the effect of the present invention is not deteriorated.

In this reflective layer, thermal diffusion is easily caused from the protective layer and amorphous marks are easily recorded by increasing the cooling speed of the molten recording layer at the time of writing. The reflective layer provides the effect of improving the contrast of the read-out signals by virtue of optical interference and the effect of preventing thermal deformation of the deformation prevention layer and the like.

The thickness of the reflective layer is preferably from 10 to 100 nm. Materials for the reflective layer are a metal, or a mixture of a metal with a metal oxide, metal nitride or metal carbides. These materials have adequate reflectance and absorbance of the writing beam and have a higher thermal transfer coefficient than that of the protective layer. For example, Zr, Hf, Ti, Ta, Mo, Si, Al, Au, an alloy of one or some of these metals, a mixture of one or some of the metals with Zr oxides, Si oxides, Si nitrides or Al oxides. Particularly, preferred are Hf, Ta, or known alloys including Hf or Ta as the principal component because of their high chemical stability can protect the recording layer from the surrounding environment, can prevent oxidation and corrosion and can improve the life of the optical recording medium. More preferred are Hf or alloys including Hf as the principal component because they provide high erasability.

The substrate material of the conventional recording media such as plastics, glass, metal such as aluminum, etc., can be used for the substrate of the present invention. When writing is made by use of a focused light beam from the substrate side in order to avoid any influences of dust and scratches of the substrate, a transparent material is preferably used for the substrate. Examples of such a material include glass, polycarbonate, polymethyl methacrylate, polyolefin resins, epoxy resins, polyimide resins, and the like.

Particularly preferred are the polycarbonate resin and the epoxy resin because they have low optical birefringence and hygroscopicity and can be molded easily. Particularly when high heat resistance is required, the epoxy resin is preferred.

Glass is a preferred material when extremely high reliability is required, because it has high thermal and chemical stability.

Though there is no restriction to the thickness of the substrate, it is practically from 0.01 to 5 mm. If the thickness is too small, the recording media are susceptible to the influences of dust when writing is made by the optical beam focused from the substrate side and if it is too great, it is difficult to use an objective lens with large numerical aperture and the beam spot size of the radiation beam becomes large so that recording density cannot be increased easily. The substrate may be either flexible or rigid. The flexible substrate can be used in a tape form, a sheet form or a card form. The rigid substrate can be used in the card form or a disk form. The optical recording medium of the present invention may be laminated to have an air sandwich structure, an air incident structure or a solid structure after the recording layer and the like are formed.

The optical source used for writing of the optical recording media of the present invention is an optical source having high intensity such as a laser beam or a strobo beam and a semiconductor laser beam is particularly preferred because the optical sources can be made compact, their power consumption is low and the modulation is easy.

Writing is made by irradiating a laser beam pulse or the like to the recording layer in the crystalline state to form amorphous recording marks. Recording marks in the crystal state may be formed on the amorphous recording layer, on the contrary. Erasing can be made by crystallizing the amorphous recording marks by the irradiation of the laser beam or by changing the state of the recording marks in crystalline state into amorphous.

It is preferred to employ a method that the amorphous recording marks are formed at the time of writing and crystallization are performed at the time of erasing because the writing speed can be improved and deformation of the recording layer does not occur easily.

Single beam overwriting is preferred because the rewriting time is short. In the single beam overwriting, laser beam power is modulated between peak level for amorphization and bias level for crystallization.

Where emphasis is put on erasability, the principal portions of the optical recording medium are preferably constituted in the following way because erasability is great.

In other words, preferred is the structure wherein the first protective layer is from 50 to 300 nm thick, the second protective layer is from 10 to 30 nm thick, the recording layer is from 10 to 60 nm thick and the reflective layer is from 20 to 100 nm thick, because the recording layer can be quenched rapidly. However, this structure is not particularly limitative and other layers such as a resin protection layer of a UV curing resin or an adhesive layer for lamination with another substrate may be disposed on the reflective layer within the range where the effects of the present invention are not deteriorated.

Furthermore, it is more preferred that the optical recording medium has the structure described above and its recording layer has the composition expressed by the following formula:

$$(Pd_xSb_yTe_{1-x-y})_{1-z}(Te_{0.5}Ge_{0.5})_z$$

$$0.01 \leq x \leq 0.1$$

$$0.35 \leq y \leq 0.45$$

$$0.2 \leq z \leq 0.4$$

where each of x, y, z and 0.5 represents the atomic fraction of each element.

The material of the reflective layer of the optical recording medium having the structure described above is preferably Au or Al or alloys comprising Au or Ag as the principal component because writing in a high density can be made.

Where emphasis is put on write sensitivity, the constituent members of the optical recording medium have preferably the following structure since writing sensitivity is high.

In other words, preferred is a structure wherein the first protective layer is from 50 to 300 nm thick, the second deformation prevention layer is from 150 to 250 nm thick, the recording layer is from 10 to 60 nm thick and the reflective layer is from 20 to 100 nm thick. However, this structure is not particularly limitative and other layers such as a resin protection layer of a UV curing resin, an adhesive layer for lamination with another substrate, and the like, may be disposed on the second deformation prevention layer within the range where the effects of the present invention are not deteriorated.

In the structure described above, the recording layer has particularly preferably the following composition:

$$(Pd_xSb_yTe_{1-x-y})_{1-z}(Te_{0.5}Ge_{0.5})_z$$

$$0.01 \leq x \leq 0.1$$

$$0.45 \leq y \leq 0.65$$

$$0.2 \leq z \leq 0.4$$

where each of x, y, z and 0.5 represents the atomic fraction of each element.

Since erasability is high, it is particularly preferred to use Hf or an alloys comprising Hf as the principal component as the material of the reflective layer.

Next, the production method of the optical recording media of the present invention will be described.

Known thin film formation methods in vacuum, e.g. vacuum evaporation, ion plating, sputtering, can be used as the method of forming the recording layer, the protective layers, the reflective layers and the like on the substrate. Particularly preferred in sputtering because the composition and the film thickness can be controlled easily.

The thickness of the recording layer and the like to be formed can be controlled easily by monitoring it by a thickness meter such as a crystal oscillator or the like.

The formation of the recording layer and the like may be carried out while the substrate is kept fixed, or is under the moving or rotating state. It is preferred to turn the substrate on its own axis because of good uniformity of the deposited film thickness inside the plane is high and it is more preferred to combine the revolution.

After the recording layer, the protective layer and the like are formed, other layers such as a resin protective layer of UV curing resins may be formed, whenever necessary, in order to prevent scratches and deformation. After the recording layer, the protective layer and the like are formed or after the resin protective layer described above is formed further thereon, two substrates may be bonded to to each other by an adhesive.

EXAMPLES

The present invention will be hereinafter described with reference to examples thereof but the invention is not limited thereto.

Incidentally, the compositions of the recording layers in the examples were confirmed by an inductively coupled plasma atomic emission spectrometry (SEIKO FTS-1100).

The carrier-to-noise ratio (C/N) of the writing signals was measured by a spectrum analyzer. Erasability is defined as the difference obtained by substracting the residual signal level of written marks after a signal pass erasure or rewrite with another frequency by overwriting from the original recorded carrier signal level.

EXAMPLE 1

A recording layer, protective layers and a reflective layer were formed by sputtering while a polycarbonate substrate which was 1.2 mm thick and 13 cm in diameter and equipped with spiral grooves of 1.6 μm pitch was being rotated at 30 r.p.m.

First of all, after pump-down was made to $7 \times 10^{-5}$ Pa, a 130 nm-thick first protective layer of ZnS was formed on the substrate by sputtering in an Ar gas atmosphere of $6 \times 10^{-1}$ Pa. While the thickness of Te, Sb, TeGe and Pd was being monitored by a quartz thickness meter, a 50 nm-thick recording layer having a composition of $(Pd_{0.04}Sb_{0.55}Te_{0.38})_{0.65}(Ge_{0.5}Te_{0.5})_{0.35}$ was formed by co-sputtering. A 200 nm-thick second protective layer of ZnS was formed on the recording layer and a 40 nm-thick Hf layer was formed as the reflective layer on this second protective layer, thereby constituting the optical recording medium of the present invention.

While this optical recording medium was being rotated at a linear velocity of 1.5 m/sec, a semiconductor laser beam of a wavelength of 830 nm which was focused by an objective lens having a numerical aperture of 0.5 was continuously irradiated with erase power of 3.4 mW and scanned twice on the tracks so as to crystallize the recording layer. Due to this crystallization, reflectance of the recording layer was raised twice the initial value. Thereafter, writing was carried out by a 15 mW semiconductor laser beam modulated to a frequency of 4.5 MHz and duty of 50% at a linear velocity of 15 m/sec by use of the same optical system as described above.

After writing, the intensity of the semiconductor laser beam was changed to 0.7 mW to scan the written part so as to read the written part. As a result, it could be confirmed that reflectance of the recording mark portions dropped due to the change to the amorphous state and writing was effected. The C/N of the read-out signal was measured under the condition of a band width of 30 kHz. The carrier intensity of the writing frequency was found to be $-14.5$ dBm, the noise level was found to be $-65$ dBm and the C/N ratio was 50.5 dB at which good digital recording could be made. This writing condition corresponded to a high speed data rate of 6.7 Mbps in a (2,7) code.

When a semiconductor laser beam of 9 mW was irradiated once to the written portions at a linear velocity of 15 m/sec., the written content was erased. The erasability at this time was as good as 30 dB. It could be understood from the result described above that erasing could be made by the irradiation of an erasing optical beam of about 70 nsec. Even after writing and erasing cycles of 1,000 times under the writing and erasing conditions described above, the laser power necessary for writing and erasing remained unchanged, the increase in the noise level of the read-out signal could not be observed and degradation of the recording characteristics could be hardly observed, either, with C/N being 50.5 dB. Degradation of erasability could not be observed, and, in erasability a good value of 30 dB could be obtained.

Since writing and erasing could be carried out at the same linear velocity as described above, rewriting by the single beam overwrite system which effects rewriting by a single operation by superposing the writing pulse with the power of the erasing level could be estimated as being possible.

When the optical recording medium written under the writing condition described above was read after it was left standing for 1,000 hours in a temperature-humidity chamber at 60° C. and 90% R.H., the change of the C/N was within 3 dB and degradation could be hardly observed. When writing was made once again, C/N hardly changed in comparison with the value before the recording medium was placed into the temperature-humidity chamber. From this result, the medium was estimated to have a life of more than 10 years.

When the crystallization temperature of this recording layer was measured from the change of the D.C. resistance at the time of temperature rise and from the change of the light transmission, it was found to be 160° C. at the rate of temperature rise of 10° C./min. Accordingly, thermal stability at normal temperature was estimated to be good.

EXAMPLE 2

An optical recording medium was produced in the same way as in Example 1 except that the composition of the recording layer of Example 1 was changed to $(Au_{0.03}Sb_{0.49}Te_{0.48})_{0.7}(Ge_{0.5}Te_{0.5})_{0.3}$ and the reflective layer was changed to a 20 nm-thick Au layer. The recording layer of this optical recording medium was crystallized under the same condition as that of Example 1. At this time, reflectance of the recording layer rose twice the initial value due to crystallization. Thereafter, writing was effected by a 12 mW semiconductor laser beam modulated to a frequency of 2.5 MHz and duty of 50% by use of the same optical system as the one described already under the condition of a linear velocity of 7.5 m/sec.

When reading of this optical recording medium was effected at 7.5 m/sec, the C/N of the read-out signal was found to be 50 dB. This written part could be erased under the erasing condition of a linear velocity of 7.5 m/sec and at 6.0 mW. Erasability at this time was 26 dB.

EXAMPLE 3

An optical recording medium was produced in the same way as in Example 1 except that the substrate of Example 1 was changed to a 1.2 mm-thick polymethyl methacrylate sheet of 32 mm square. Writing and erasing were carried out by use of the same optical system as that of Example 1 while this recording medium was fixed under the stationary state. The writing pulse was 20 mW and 100 nsec and the erasing pulse was 9.5 mW and 100 nsec. Reading was made at 0.5 mW. Even after the writing and erasing cycles of 100,000 times, writing and erasing were possible and hardly any change of the reflections at written and erased states could be observed. Furthermore, degradation of the characteristics could not be observed.

The crystallization temperature of this recording layer was measured from the change of the D.C. resistance at the time of temperature rise and from the change of light transmission. It was found to be 160° C. at the temperature rise condition of 10° C./min. Accordingly, thermal stability at normal temperature was estimated to be good.

COMPARATIVE EXAMPLE 1

An optical recording medium was produced in the same way as in Example 2 except that the composition of the recording layer of Example 2 was changed to the following composition (a):

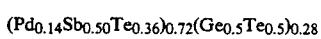

$$(Pd_{0.14}Sb_{0.50}Te_{0.36})_{0.72}(Ge_{0.5}Te_{0.5})_{0.28} \qquad (a)$$

In the case of the composition (a), when writing and erasing were repeated under the same writing and erasing conditions as those of Example 2, the erasing characteristics got remarkably deteriorated after 10 cycles. The erase ratio at this time dropped to about 15 dB.

COMPARATIVE EXAMPLE 2

Optical recording media were produced in the same way as in Example 3 except that the composition of the recording layer in Example 3 was changed to the following compositions (b) and (c), and writing and erasing were carried out in the same way.

$$(Sb_{0.60}Te_{0.40})_{0.7}(Ge_{0.5}Te_{0.5})_{0.3} \quad (b)$$

$$(Au_{0.05}Sb_{0.75}Te_{0.20})_{0.7}(Ge_{0.5}Te_{0.5})_{0.3} \quad (c)$$

In the case of the compositions (b) and (c), the difference of reflectance between the writing state and the erasing state fluctuated and was unstable with writing and erasing cycles. The variation of the reflectance became gradually smaller after writing and erasing of 10,000 times and writing and erasing became difficult.

EXAMPLE 4

An optical recording medium was produced in the same way as in Example 3 except that the composition of the recording layer was changed to $(Ag_{0.05}Sb_{0.57}Te_{0.38})_{0.7}(Ge_{0.5}Te_{0.5})_{0.3}$.

Writing and erasing of this optical recording medium was carried out in the same way as in Example 3. The writing pulse was 14 mW and 200 ns and the erasing pulse was 6 mW and 300 nsec. Reading was carried out at 0.5 mW. Writing and erasing were possible even after the writing and erasing cycles of 100,000 times under this condition.

EXAMPLE 5

An optical recording medium was produced in the same way as in Example 3 except that the composition of the recording layer in Example 3 was changed to $(Ni_{0.03}Sb_{0.39}Te_{0.58})_{0.64}(Ge_{0.5}Te_{0.5})_{0.36}$, and writing and erasing were effected in the same way as in Example 3. The writing pulse was 17 mW and 100 nsec and the erasing pulse was 8 mW and 100 nsec. Reading was carried out at 0.5 mW. Writing and erasing were possible 100,000 times under this condition. An optical recording medium having a recording layer of the composition $(Pd_{0.04}Sb_{0.47}Te_{0.49})_{0.66}(Ge_{0.5}Te_{0.5})_{0.34}$ was produced in the same way as above and writing and erasing were effected under the same writing condition. As a result, the writing and erasing cycles of 1,000,000 times were possible.

EXAMPLE 6

The material of a recording layer having the composition of $(Pd_{0.04}Sb_{0.47}Te_{0.49})_{0.66}(Ge_{0.5}Te_{0.5})_{0.34}$ of Example 5 was deposited on a fluororesin sheet ("Teflon") of Du Pont in a thickness of 500 nm by use of the same sputtering apparatus as that of Example 1. Thereafter, the recording layer in the amorphous state was scarped off to prepare the powder of the recording layer. The powder was subjected to DSC measurement (differential scanning calorimetry). The sample amount was 8 mg for each measurement. A calorimeter DSC-50 of Shimazu Seisakusho was used for measurement.

The peak temperature of crystallization when measured at the temperature rise rate of 10° C./min was 185° C. and was 190° C. at the temperature rise rate of 20° C./min, and this value was sufficiently higher than the normal ambient temperature of use.

Activation energy determined from the measurement results at the temperature rise rates of 5° C./min, 10° C./min, 20° C./min and 40° was 2.2 eV.

The crystallization temperature of the material $Ge_2Sb_2Te_5$ of the recording layer of the prior art reference was 142° C. and activation energy was 2.2 eV [N. Yamada et al., Jpn. J. Appl. Phys. 26, Suppl., 26-4, 61–66(1987)]. In comparison with this prior art reference, the amorphous state of the recording layer of the present invention had sufficiently higher thermal stability and stability of the recording marks was also higher.

EXAMPLE 7

An optical recording medium having the structure shown in FIG. 13 was produced by changing the composition of the recording layer of Example 1 to $(Pd_{0.03}Sb_{0.47}Te_{0.50})_{0.66}(Ge_{0.5}Te_{0.5})_{0.34}$, forming the reflective layer by a 50 nm-thick film of an $Ni_{80}Cr_{20}$ alloy and forming further a 0.01 mm-thick protective layer of an acrylic UV curing resin on this reflective layer. In the drawing, reference numerals represent the following members.

1: substrate
2: first protective layer
3: recording layer
4: second protective layer
5: reflective layer
6: resin protective layer Writing and erasing cycle was repeated 20 times onto this recording film in the same way as in Example 1 except that the recording frequency was set to 5.33 MHz. The C/N of the read-out signal after writing 20 times was 50 dB. Thereafter, only the erasing power was changed within the range of 7 mW~12 mW and writing and erasing were repeated to measure the erasability. The results were shown in the following Table 1. Good values of erasability of more than 30 dB could be obtained in a wide power range of 9 to 12 mW.

TABLE 1

| erasing power (mW) | erasability (dB) |
|---|---|
| 7.5 | 21.1 |
| 8.0 | 28.9 |
| 9.0 | 30.5 |
| 10.5 | 30.0 |
| 11.0 | 32.0 |
| 11.5 | 32.0 |
| 12.0 | 30.4 |

COMPARATIVE EXAMPLE 3

An optical recording medium was produced by changing the composition of the recording layer of Example 7 to a composition corresponding substantially to $(Sb_{0.48}Te_{0.52})_{0.64}(Ge_{0.5}Te_{0.5})_{0.36}$ which was obtained by removing Pd from the composition of the recording layer of Example 7, and measurement was carried out in the same way as in Example 7. C/N after writing of 20 times was 50 dB. The results of measurement were shown in the following Table 2. Erasability was at most about 26 dB at 9 mW~12 mW but this value was lower by 4 dB than the value of Example 7.

TABLE 2

| erasing power (mW) | erasability (dB) |
|---|---|
| 7.0 | 12.8 |
| 8.0 | 24.8 |
| 9.0 | 26.1 |
| 10.0 | 25.3 |
| 11.0 | 26.8 |
| 12.0 | 26.4 |

EXAMPLE 8

The following recording layer, deformation prevention layers and reflective layer were formed on the same substrate as that of Example 1 by use of the same sputtering apparatus, the same vacuum and in the same Ar gas atmosphere as in Example 1, and a protective layer of an acrylic UV curing resin was formed to obtain an optical recording medium having the following layer structure.

Layer Structure substrate/first protective layer/
recording layer/second protective layer/
reflective layer/resin protective layer
first protective layer: ZnS, 160 nm thick
recording layer: $(Pd_{0.03}Sb_{0.47}Te_{0.50})_{0.66}(Ge_{0.5}Te_{0.5})_{0.34}$ 30 nm thick
second protective layer: $Si_3N_4$, 20 nm thick
reflective layer: Au, 40 nm thick
resin protective layer: acrylic resin, 0.01 mm thick Single beam overwrite was effected to this optical recording medium by use of the same writing apparatus as that of Example 1 except that the numerical aperture (N.A.) of the objective was 0.55 and the wavelength of the semiconductor laser was 780 nm.

The writing conditions were the linear velocity of 8 m/sec, the writing power level of 16 mW and the erasing power level of 9 mW and writing was repeated alternately 10 times by the writing frequency of 3.7 MHz and 1.4 MHz (each pulse width was 90 nsec constant), and the C/N after writing at 3.7 MHz and erasability at 3.7 MHz after overwrite at 1.4 MHz were measured. As a result, a good value of the C/N of 50 dB and the erasability of 28 dB could be obtained and the optical recording medium of the present invention was confirmed to have excellent overwrite characteristics.

What is claimed is:

1. An optical recording medium comprising a substrate and at least each of a recording layer and a protective layer, said recording layer being formed on said substrate for recording information thereon or reading or erasing information on record thereon by light-irradiation on the recording layer, wherein the recording and erasing of information takes place through a phase transition between an amorphous phase and a crystalline phase in said recording layer, said recording layer comprising a solid solution of a palladium, antimony and tellurium alloy with germanium, telluride, and having a composition represented by the following formula:

$$(M_xSb_yTe_{1-x-y})_{1-z}(Te_{0.5}Ge_{0.5})_z$$

wherein M is palladium; each of X, Y and Z represents the atomic fraction of respective elements; and $0.01 \leq X \leq 0.1$, $0.35 \leq Y \leq 0.65$ and $0.2 \leq Z \leq 0.4$.

2. An optical recording medium according to claim 1, wherein said optical recording medium comprises a substrate/first protective layer/recording layer/second protective layer.

3. The optical recording medium according to claim 1, wherein said optical recording medium comprises a substrate/first protective layer/recording layer/second layer/reflective layer.

4. An optical recording medium according to claim 3, wherein the material of said reflective layer is hafnium (Hf), tantalum (Ta) or an alloy containing Hf or Ta as its principal component.

5. An optical recording medium according to claim 3, wherein said first protective layer is 50 nm~300 nm thick, said second protective layer is 10 nm~30 nm thick, said recording layer is 10 nm~60 nm thick and said reflective layer is 20 nm~100 nm thick.

6. An optical recording medium according to claim 3, wherein said first protective layer is 50 nm~300 nm thick, said second protective layer is 150 nm~250 nm thick, said recording layer is 10 nm~60 nm thick and said reflective layer is 20 nm~100 nm thick.

7. An optical recording layer according to claim 5, wherein the metal of said reflective layer is Au or Al or an alloy containing Au or Al as its principal component.

8. An optical recording medium according to claim 6, wherein the metal of said reflective layer is Hf or an alloy of Hf as its principal component.

9. An optical recording medium according to claim 5, wherein the composition of said recording layer is expressed by the following formula:

$$(Pd_xSb_yTe_{1-x-y})_{1-z}(Te_{0.5}Ge_{0.5})_z$$

$$0.01 \leq x \leq 0.1$$

$$0.35 \leq y \leq 0.45$$

$$0.2 \leq z \leq 0.4$$

where each of x, y, z and 0.5 represents the atomic fraction of each element.

10. An optical recording medium according to claim 6, wherein the composition of said recording layer is expressed by the following formula:

$$(Pd_xSb_yTe_{1-x-y})_{1-z}(Te_{0.5}Ge_{0.5})_z$$

$$0.01 \leq x \leq 0.1$$

$$0.45 \leq y \leq 0.65$$

$$0.2 \leq z \leq 0.4$$

where each of x, y, z and 0.5 represents the atomic fraction of each element.

* * * * *

UNITED STATES PATENT AND TRADEMARK OFFICE
CERTIFICATE OF CORRECTION

PATENT NO. : 5,063,097

DATED : November 5, 1991

INVENTOR(S) : Kusato HIROTA et al

It is certified that error appears in the above-identified patent and that said Letters Patent is hereby corrected as shown below:

On the cover page, after Item [22], the following should appear:

-- [30] Foreign Application Priority Data
Dec. 16, 1988 [JP] Japan . . . . . . . . . . 63-319284 --

Signed and Sealed this

Thirtieth Day of March, 1993

Attest:

STEPHEN G. KUNIN

Attesting Officer

Acting Commissioner of Patents and Trademarks